US012563076B2

(12) United States Patent
Zhang et al.

(10) Patent No.: US 12,563,076 B2
(45) Date of Patent: Feb. 24, 2026

(54) SYSTEMS AND METHODS FOR RISK AWARE OUTBOUND COMMUNICATION SCANNING

(71) Applicant: Capital One Services, LLC, McLean, VA (US)

(72) Inventors: Rui Zhang, New York, NY (US); Sudheendra Kumar Kaanugovi, Aldie, VA (US); Jeremy Goodsitt, Champaign, IL (US); Dustin Summers, Lovettsville, VA (US); Sandeep Gadde, Ashburn, VA (US); Austin Walters, Columbia, TN (US)

(73) Assignee: Capital One Services, LLC, McLean, VA (US)

( * ) Notice: Subject to any disclaimer, the term of this patent is extended or adjusted under 35 U.S.C. 154(b) by 517 days.

(21) Appl. No.: 17/806,369

(22) Filed: Jun. 10, 2022

(65) Prior Publication Data

US 2023/0403293 A1     Dec. 14, 2023

(51) Int. Cl.
| | |
|---|---|
| G06F 21/00 | (2013.01) |
| H04L 9/40 | (2022.01) |
| H04L 41/16 | (2022.01) |

(52) U.S. Cl.
CPC .......... H04L 63/1433 (2013.01); H04L 41/16 (2013.01); H04L 63/0861 (2013.01); H04L 63/20 (2013.01)

(58) Field of Classification Search
CPC . H04L 63/1433; H04L 41/16; H04L 63/0861; H04L 63/20; H04L 63/0414; H04L 63/08; H04L 63/102; H04L 63/1416; G06N 3/0442; G06N 3/0464; G06N 3/088; G06N 3/0895; G06N 3/09; G06N 20/00; G06F 21/6254
See application file for complete search history.

(56) References Cited

U.S. PATENT DOCUMENTS

| | | | |
|---|---|---|---|
| 8,286,239 B1 * | 10/2012 | Sutton | ................... H04L 63/126 726/22 |
| 8,601,152 B1 | 12/2013 | Chou | |
| 2016/0081061 A1 * | 3/2016 | Hu | ....................... H04W 72/044 370/312 |
| 2018/0007014 A1 | 1/2018 | Neal | |

(Continued)

*Primary Examiner* — Michael M Lee
(74) *Attorney, Agent, or Firm* — Bookoff McAndrews, PLLC

(57) ABSTRACT

Systems and methods for securing data for outbound communication may include: determining a risk profile for the outbound communication based, the outbound communication comprising data modules including at least a payload, an origination endpoint, and a destination endpoint; determining a scanning policy from a plurality of scanning policies, based on the determined risk profile; determining a secure machine learning model from a plurality of secure machine learning models, based on the determined risk profile, wherein the secure machine learning model is determined based on an authentication level corresponding to the determined risk profile; providing one or more data modules to the secure machine learning model, based on the determined scanning policy; receiving a sanitized version of the payload based on an output of the secure machine learning model; and providing the sanitized version of the payload for the outbound communication.

20 Claims, 5 Drawing Sheets

(56) References Cited

U.S. PATENT DOCUMENTS

| | | | |
|---|---|---|---|
| 2019/0158503 A1* | 5/2019 | Bansal | H04L 63/0272 |
| 2020/0267162 A1 | 8/2020 | Koottayi et al. | |
| 2020/0296134 A1* | 9/2020 | Sreedhar | H04L 63/20 |
| 2020/0372509 A1 | 11/2020 | Phalnikar | |
| 2021/0058395 A1* | 2/2021 | Jakobsson | H04L 67/306 |
| 2021/0232981 A1* | 7/2021 | Sundaresan | G06F 18/2148 |
| 2022/0012352 A1 | 1/2022 | Boding et al. | |
| 2022/0141220 A1* | 5/2022 | Lind | H04L 63/1433 |
| 2022/0150132 A1* | 5/2022 | Fiumara | G06N 20/00 |
| 2022/0284884 A1* | 9/2022 | Tongya | A63F 13/67 |
| 2022/0366078 A1* | 11/2022 | Kirti | G06N 5/022 |
| 2023/0041015 A1* | 2/2023 | Chhibber | G06N 20/00 |
| 2023/0229803 A1* | 7/2023 | Mozer | G10L 21/007 |
| | | | 726/26 |

* cited by examiner

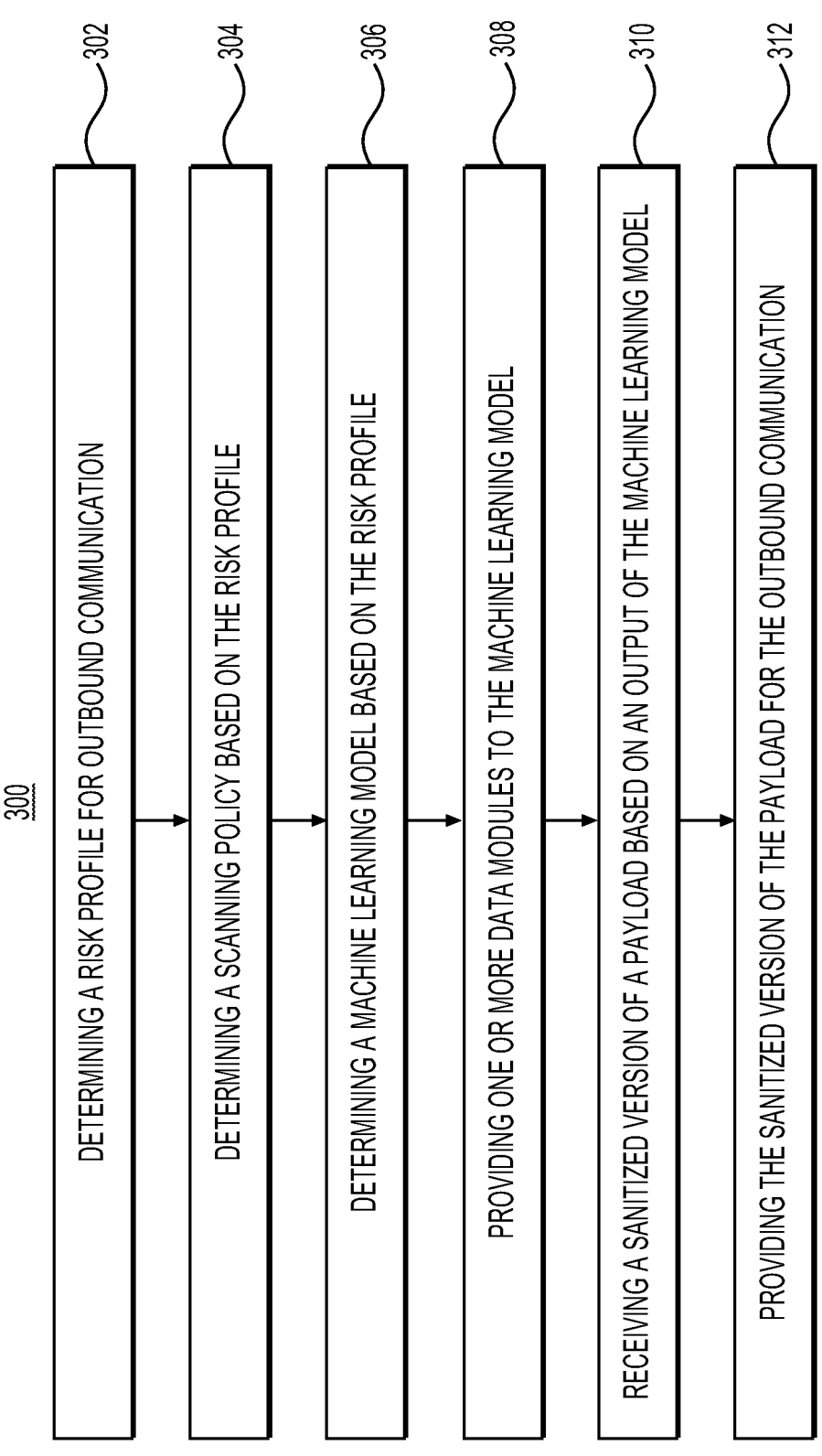

300

302 — DETERMINING A RISK PROFILE FOR OUTBOUND COMMUNICATION

304 — DETERMINING A SCANNING POLICY BASED ON THE RISK PROFILE

306 — DETERMINING A MACHINE LEARNING MODEL BASED ON THE RISK PROFILE

308 — PROVIDING ONE OR MORE DATA MODULES TO THE MACHINE LEARNING MODEL

310 — RECEIVING A SANITIZED VERSION OF A PAYLOAD BASED ON AN OUTPUT OF THE MACHINE LEARNING MODEL

312 — PROVIDING THE SANITIZED VERSION OF THE PAYLOAD FOR THE OUTBOUND COMMUNICATION

*FIG. 3*

SYSTEMS AND METHODS FOR RISK AWARE OUTBOUND COMMUNICATION SCANNING

TECHNICAL FIELD

Various embodiments of the present disclosure relate generally to preventing transmission of secure outgoing data, and more particularly to, systems and methods for sanitizing outbound communications to prevent transmission of secure data based on risk profiles.

BACKGROUND

Outbound data communication from a data source (e.g., an application) can often lead to unintended transmission of sensitive data. For example, data including sensitive data such as personal identifiable information (PII) can be stored or accessible via a data source. The data may be communicated via outbound communications to one or more external entities (e.g., third party systems). During such communication, sensitive data may be included in the transmission from a trusted data source to an untrusted destination endpoint. Transmission of such sensitive data may lead to security risks. Global rules to prevent such transmissions are resource intensive and/or reduce operational efficiency due to non-targeted data transmission prevention.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for authenticating external accounts.

In one aspect, an exemplary embodiment of a method for securing data for outbound communication may include: determining a risk profile for the outbound communication based on one or more of a user device, an application, or a user profile associated with the outbound communication, the outbound communication comprising data modules including at least a payload, an origination endpoint, and a destination endpoint; determining a scanning policy from a plurality of scanning policies, based on the determined risk profile, each of the plurality of scanning policies comprising different data modules than one or more other scanning policies; determining a secure machine learning model from a plurality of secure machine learning models, based on the determined risk profile, wherein the secure machine learning model is determined based on an authentication level corresponding to the determined risk profile; providing one or more data modules to the secure machine learning model, based on the determined scanning policy; receiving a sanitized version of the payload based on an output of the secure machine learning model; and providing the sanitized version of the payload for the outbound communication.

In another aspect, an exemplary embodiment of a method for securing data for outbound communication may include: determining a risk profile for the outbound communication based on one or more of a user device, an application, or a user profile associated with the outbound communication, the outbound communication comprising data modules including at least a payload, an origination endpoint, and a destination endpoint; determining a scanning policy from a plurality of scanning policies, based on the determined risk profile, each of the plurality of scanning policies comprising different data modules than one or more other scanning policies; determining a secure machine learning model from a plurality of secure machine learning models, based on the determined risk profile, wherein the machine learning model is determined based on an authentication level corresponding to the determined risk profile; providing one or more data modules to the secure machine learning model, based on the determined scanning policy; identifying a data risk value based on an output of the secure machine learning model, based on the risk profile and the payload; based on the data risk value, determining one of allowing the outbound communication, preventing the outbound communication, or sanitizing the payload.

In another aspect, an exemplary embodiment of a system including a data storage device storing processor-readable instructions and a processor operatively connected to the data storage device and configured to execute the instructions to perform operations may include: determining a risk profile for the outbound communication based on one or more of a user device, an application, or a user profile associated with the outbound communication, the outbound communication comprising data modules including at least a payload, an origination endpoint, and a destination endpoint; determining a scanning policy from a plurality of scanning policies, based on the determined risk profile, each of the plurality of scanning policies comprising different data modules than one or more other scanning policies; determining a secure machine learning model from a plurality of secure machine learning models, based on the determined risk profile, wherein the secure machine learning model is determined based on an authentication level corresponding to the determined risk profile; providing one or more data modules to the secure machine learning model, based on the determined scanning policy; receiving a sanitized version of the payload based on an output of the secure machine learning model; and providing the sanitized version of the payload for the outbound communication.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart of an exemplary method of securing data for outbound communication, according to one or more embodiments.

DETAILED DESCRIPTION OF EMBODIMENTS

Figure 1:
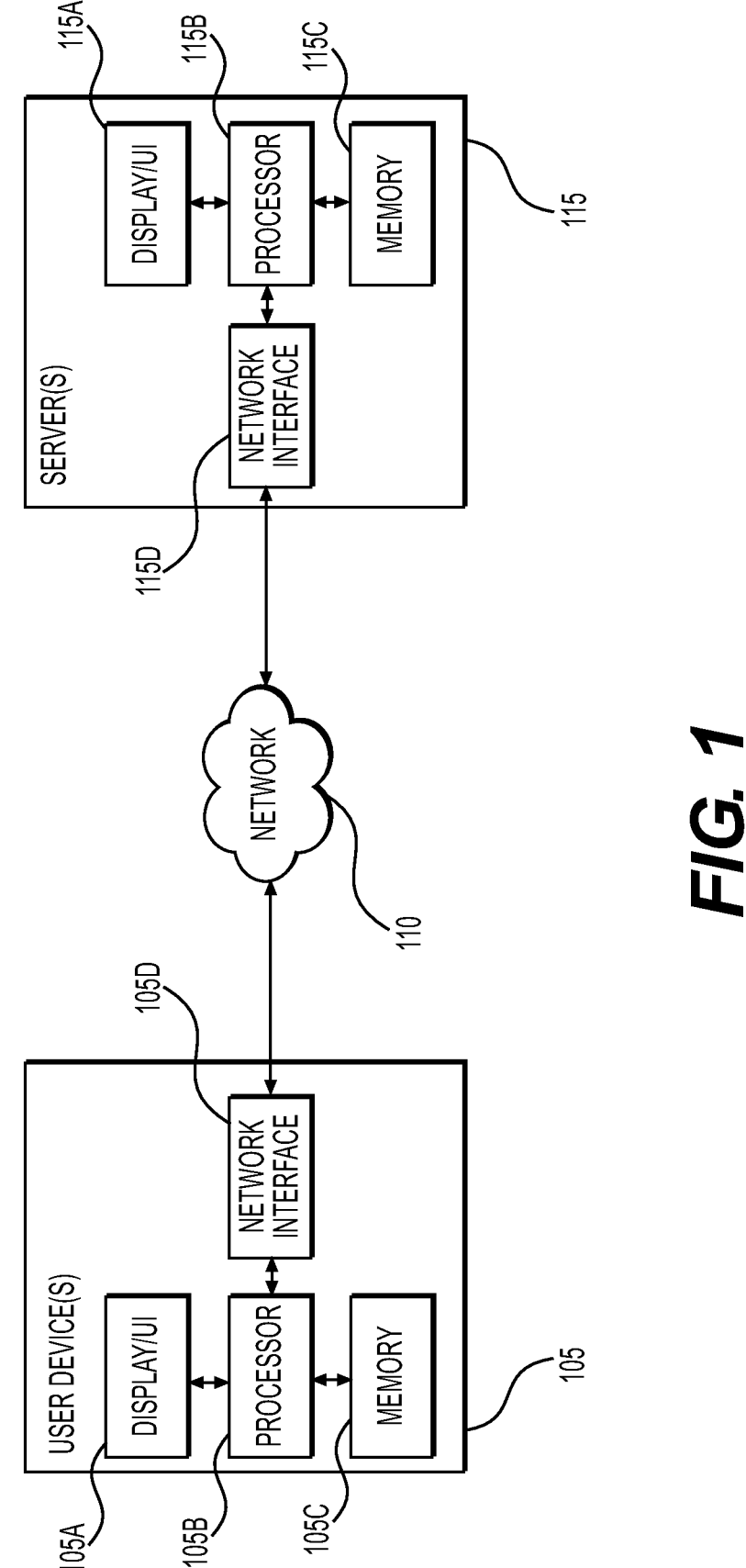
FIG. 1 depicts an exemplary environment for data transmission, according to one or more embodiments.

According to certain aspects of the disclosure, methods and systems are disclosed for securing data for outbound communication. A data source (e.g., an application) may have access to data or may include data that can be transmitted external to the data source. The external transmission may be an outbound communication to an external entity. As disclosed herein, an outbound communication may be to an external entity (e.g., a destination or component) or may be transmission to a storage location (e.g., a database, a memory, a server, or the like. The external entity may be a trusted entity (e.g., a first party system) and/or an untrusted entity (e.g., a third party system). The data source or one or more components (e.g., an application programming interface (API), a software development kit (SDK), etc.) may trigger an outbound communication of data, to the external entity.

Based on the trigger for outbound communication, a determination may be made whether the data or part of the data (e.g., a secure portion of the data) for the outbound communication should be allowed, sanitized, or prevented from being transmitted. The determination may be made based on a risk profile associated with a user device, the data source (e.g., the application), or a user profile. The risk profile may indicate to what degree data to be transmitted in the outbound communication should be evaluated for sanitizing or prevention of transmission. For example, a higher authentication (e.g., at a user device) based on a trusted facial recognition access control may result in a low risk profile that indicates a lower degree of data evaluation. Similarly, for example, a lower authentication based on a weak password to access an application may result in a high risk profile that indicates a higher degree of data evaluation. As applied herein, a higher authentication is higher when compared to a lower or lesser authentication.

A scanning policy from a plurality of scanning policies may be identified based on the risk profile. The scanning policies may indicate which one or more of a plurality of data modules (e.g., a payload or payload component, an origination end point, a destination end point, etc.) is to be evaluated by a secure machine learning model. For example, if the risk profile indicates a lower degree of data evaluation, then an identified scanning policy may include the origination end point and the destination end point. Alternatively, for example, if the risk profile indicates a higher degree of data evaluation (e.g., relative to a lower degree of data evaluation), then an identified scanning policy may include the payload in addition to the origination and destination end points. The scanning policy may be determined to allocate an applicable number of resources to outbound communications. As noted herein, the outbound communication may be to an external entity or a storage (e.g., to a storage location) For example, for a risk profile for an outbound communication that indicates a low risk (e.g., a higher authentication), less resources (e.g., less data modules input to a secure machine learning model) may be expended. For a risk profile for an outbound communication that indicates a higher risk (e.g., a lower authentication), more resources (e.g., more data modules input to a secure machine learning model) may be expended.

A secure machine learning model may be determined from a plurality of machine learning models. The secure machine learning model may be determined based on a risk profile associated with an outbound communication. The secure machine learning model may be determined to balance the risk indicated by the risk profile with the resources appropriate for such risk. Different combinations of scanning policies and secure machine learning models may be selected based on a same risk value (e.g., a same risk score). For example, a scanning policy and secure machine learning model combination may be determined based on a user device that implements two factor authentication and is associated with a first user profile. However, a different scanning policy and secure machine learning model combination may be determined based on another user device that implements two factor authentication but is associated with a second user profile. Accordingly, a risk profile may include risk values (e.g., risk scores) and other numerical and/or non-numerical attributes.

The secure machine learning model may receive one or more inputs including one or more data modules. The secure machine learning model may output an outcome (e.g., a score or determination) for whether data associated with the outbound communication should be allowed to be transmitted, prevented from being transmitted, or should be sanitized prior to transmission. The secure machine learning model may be determined to allocate an applicable number of resources to outbound communications. For example, less resources (e.g., a less complicated or less computationally intensive machine learning model) may be expended for a risk profile for an outbound communication that indicates a low risk (e.g., a higher authentication). More resources (e.g., a more complicated or more computationally intensive machine learning model) may be expended for a risk profile for an outbound communication that indicates a higher risk (e.g., a lower authentication).

The secure machine learning model may output whether data associated with the outbound communication should be allowed to be transmitted, prevented from being transmitted, or should be sanitized (e.g., redacted, scraped, erased, etc.) prior to transmission. According to an implementation, the secure machine learning model or a sanitization machine learning model may sanitize all or part of the payload (e.g., including headers, footers, etc.). A sanitized version of the payload may be provided for the outbound communication.

Accordingly, based on the techniques disclosed herein, outbound communications may be evaluated based on a risk profile associated with the outbound communication. A scanning policy may be identified to determine resources (e.g., data modules) to be evaluated by a secure machine learning model. The secure machine learning model may receive the resources as inputs, and may output a determination of whether the outbound communication should be allowed to be transmitted, prevented from being transmitted, or should be sanitized. Based on an output of the secure machine learning model, the secure machine learning model and/or a sanitization machine learning model may sanitize the payload, and may provide the sanitized payload for outbound transmission. Alternatively, based on an output of the secure machine learning model, the outbound transmission may be prevented or may be allowed without sanitization.

Techniques disclosed herein mitigate and/or prevent sensitive data from being transmitted to untrustworthy endpoints or to endpoints where data is at a higher risk of misuse. By implementing the techniques disclosed herein, targeted evaluation of an outbound communication may be conducted based on determining a risk profile of the outbound communication. The evaluation may be targeted as it may be based on a given instance of a data source (e.g., an application), a user device, a user profile, or the like, instead of a global rule. Techniques disclosed herein a) provide targeted security for outbound data transmission, b) reduce resource use (e.g., by selecting a risk appropriate scanning policy and/or selecting a risk appropriate machine learning model), c) increase processing speeds by mitigating overuse of resources, d) increase transmission speeds by applying risk appropriate resources to outbound transmission (e.g., by selecting a risk appropriate scanning policy and/or selecting a risk appropriate machine learning model), e) provide an automated way to analyze outbound transmissions, and f) improve network traffic flow by allowing risk appropriate transmissions (e.g., instead of preventing such transmissions outright).

The technical effect of the disclosed subject matter has a technical effect on one or more processes carried on outside a computer. For example, communication with a third party system (e.g., a server) is determined based on the disclosed subject matter. The speed of communication, type of communication, and/or content of communication is modified based on the techniques disclosed herein. Additionally, user abilities (e.g., in how a user uses a data source such as an application) is modified based on the prevention of outbound messages and/or sanitization disclosed herein. For example, an increased amount of security may reduce the functionality of data source.

Additionally, the resource optimization disclosed herein operates at the level of the architecture of the computer. For example, selecting data modules to input to a machine learning model and/or selecting a machine learning model based on resource expenditure optimizes resource use irrespective of the data being processed or application being run (e.g., the techniques disclosed herein are data source agnostic).

Additionally, the resource optimization and security implementations disclosed herein result in computers or respective components being operated in a new way. For example, traditional outbound messages may be processed for transmission based on a rule. However, techniques disclosed herein provide for targeted review of data, including review based on resource optimization computational exertion.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value. In this disclosure, the term "higher" refers to more, greater than, or up. In this disclosure, the term "lower" refers to below, less than, or down. As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve a risk machine learning model, transmission machine learning model, or a sanitization machine learning model, it should be understood that techniques according to this disclosure may be adapted to any suitable type of machine learning. It should also be understood that the examples above are illustrative only. The techniques and technologies of this disclosure may be adapted to any suitable activity.

A data source may be any data source that is associated with one or more users and includes information about the one or more users. A data source may be a mobile application, a web application, a website, a program, a software, a platform, an account, or the like. A data source may be accessed using credentials such as, for example, login credentials, biometric credentials, or the like. A data source may include, gather, or otherwise capture information related to information, content, transactions, likes, dislikes, locations, or the like, associated with a user. For example, a data source may include an ongoing record of purchases and related information (e.g., amounts, times, types, products, services, etc.). A data source may also approve and/or deny transactions, access to information, or the like.

An outbound communication may be any communication that originates at a data source or a portion of a data source (e.g., a secure portion), that is to be sent to an external entity or storage location. An outbound communication may include a payload. As disclosed herein, a payload may include a header, a footer, data, content, code, or the like. An outbound communication may be triggered by a user (e.g., based on a user request, action, or the like), may be triggered by a data source (e.g., by an application), may be triggered by an API or SDK (e.g., an API or SDK associated with a data source), or the like. For example, an SDK may communicate with an application and may provide and/or extract information associated with the application. The SDK may provide a functionality used by the application. Accordingly, the SDK may be configured to pull data from the application in an approved or unapproved manner.

As discussed herein, a first party may be a data source. For example, a first party may be an application that provides an interface for a user, that facilitates data transmission, that requires credentials to access, or the like. A second party may be a platform that houses, activates, or otherwise facilitates operation of a first party. A second party may be an operating system, may be firmware, may be hardware, or the like that is used to access the first party (e.g., data source). A third party may be or may use an API or SDK to communicate and/or function with the first party. A second party may house, activate, or otherwise facilitate operation of a third party. Example third parties include, but are not limited to Usabilla, NewRelic, Medallia, Fabric, Firebase, Adobe Site Catalyst, or the like. Implementations of the disclosed subject matter may be used for securing data for outbound communication from a first party, as may be triggered, requested, or otherwise facilitated by a third party. Additionally, a third party may be any party that is not the first party. For example, a third party may be a cloud server associated with an entity.

Each outbound communication may be associated with an origination endpoint and a destination endpoint (e.g., an external entity or storage). An origination endpoint may be a data source (e.g., an application) or may be a component of a data source (e.g., a secure component). For example, a given data source may store or have access to sensitive data (e.g., PII, confidential information, health information, etc.) and non-sensitive data. Accordingly, an origination endpoint may correspond to a data source component associated with the sensitive data or the non-sensitive data.

A destination endpoint may be any destination that is not a data source. A destination endpoint may be an application, a website, a software, a server, a database, a processor, a node, a storage location, a storage location or the like. A destination endpoint may be accessed locally on a same user device (e.g., mobile phone, tablet, computer, wearable device, etc.) that provides access to the data source. Alternatively, a destination endpoint may be external to a user device that provides access to the data source. A destination endpoint may be accessed via a network, as further discussed herein. The destination endpoint may be a storage location such that the outbound communication is marked for storage at the storage location. The destination endpoint may be a third party system (e.g., a server, database, storage, etc.) or may be associated with a first party. For example, the first party may be an application that provides access to a user account. A destination endpoint may be a server associated with the first party application that stores and/or communicates with the first party application.

An API or SDK may be used to access data from a data source. The API or SDK may be used to connect to the data source based on one or more service-level agreements (SLAs). The API or SDK may be configured to extract data from the data source by requesting and/or receiving content and/or metadata from the data source. As discussed herein, an outbound communication may be a communication where data is to be transmitted from a first party to a third party. The outbound communication may be triggered by an API or SDK.

A risk profile may be generated using a risk machine learning model. The risk profile may be generated based on a user device, a data source, a user profile, or the like. The user device based risk profile may be based on, for example, a user device authentication mechanism. A user device authentication mechanism may include, but is not limited to, multi-step authentication, biometric authentication, password strength, or the like. A user device authentication mechanism may be received, for example, from a user device, a cloud component, a storage, a memory, or the like. A data source based risk profile may be based on, for example, a type of data source, information associated with a data source, historical data associated with a data source, or the like. A user profile based risk profile may be based on user preferences, a user category (e.g., security category), historical user data, a user fraud score, or the like.

A risk machine learning model may receive, as inputs, data associated with how a user, API, and/or SDK gains access to a data source. For example, the risk machine learning model may receive inputs from a second party (e.g., a platform, operating system, firmware, etc.). The inputs may indicate how access to a user device and/or to a data source is granted. The risk machine learning model may associate more difficult or more sophisticated access (e.g., via biometric scanning) with a lower risk profile and may associate less difficult or less sophisticated access (e.g., via a weak password) with a higher risk profile. A risk profile output by a risk machine learning model may be a probability (e.g., a score, percentage, etc.) that a corresponding outbound transmission (e.g., to an entity or a storage location) may be at risk of a data breach, an unwanted data transmission, or the like. A risk profile output by a risk machine learning model may be a multiplier or other applicable value indicating a likelihood that a corresponding outbound transmission may be at risk of a data breach, an unwanted data transmission, or the like. For example, the multiplier may be used by a secure machine learning model to adjust one or more weights or layers when determining a correlation that a type of data in a payload is at risk, to determine whether the corresponding outbound transmission is allowed, rejected, or is to be sanitized.

A risk profile may be output by the risk machine learning model as a score (e.g., from 0-100), a scale, a percentage, or the like. Alternatively, or in addition, the risk profile may be specific to a given instance of an outbound communication. For example, if an outbound communication is triggered when a user accessed her user device using a biometric scan, then the risk profile for that outbound communication may be a lower risk profile. Alternatively, for example, if an outbound communication is triggered when the user accessed her user device using a weak passcode, then the risk profile for that outbound communication may be a higher risk profile.

According to an implementation, a risk profile may be based on historical data associated with a user device, payload, or user profile. For example, the risk machine learning model may receive a payload for outbound transmission. The risk machine learning model may output a risk profile for the outbound transmission based on similarities and/or differences between the payload and historical risk profiles or historical information from historical payloads. As another example, the risk machine learning model may receive user data associated with data source. The risk machine learning model may also receive historical fraud detection flags associated with the user. The risk machine learning model may output a risk profile further based on the fraud detection flags associated with the user.

A scanning policy may identify one or more data modules for input into a secure machine learning model. The scanning policy may be determined based on a risk level identified by a risk machine learning model. A scanning policy may be identified to balance the risk profile (e.g., higher risk, lower risk, etc.) with the amount of resources to expend. For example, a scanning policy that includes the destination endpoint and/or origination endpoint may be selected for an outbound communication having a lower risk profile. In this example, less resources may be expended by limiting the data modules provided to the secure machine learning model to the destination endpoint (e.g., to an entity or storage location) and/or origination endpoint. Alternatively, a scanning policy that includes the destination endpoint, origination endpoint, and payload may be selected for an outbound communication having a higher risk profile. In this example, more resources may be expended by also providing the payload data module to the secure machine learning model.

A secure machine learning model may use less resources based on having less data modules as inputs. For example, a secure machine learning model that is trained on fewer inputs may be sufficient to provide an output based on fewer data modules. Additionally, a secure machine learning model that is provided fewer data modules as inputs may generate one or more outputs faster than if the secure machine learning model was provided additional inputs.

A secure machine learning model may be determined from a plurality of secure machine learning models. The secure machine learning model may be configured to output whether an outbound communication is allowed, is prevented, or is to be sanitized. The secure machine learning model, or a sanitization machine learning model may output a sanitized version of a payload, if an output of the secured machine learning model is that the payload is to be sanitized.

A secure machine learning model may be determined from the plurality of secure machine learning models based on a risk profile associated with an outbound communication. A more complicated or more computationally intensive machine learning model may be determined based on a higher risk profile and a less complicated or less computationally intensive machine learning model may be determined based on a lower risk profile. Accordingly, less resources may be expended based on the determined secure machine learning model, based on the risk profile of an outbound communication. Alternatively, or in addition, according to an implementation, a secure machine learning model may be determined based on a payload property (e.g., type of payload, data included in a payload, size of payload, etc.).

FIG. 1 depicts an exemplary system 100 for accessing a data source using one or more user devices 105, according to one or more embodiments, and which may be used with the techniques presented herein. The system 100 may include one or more user device(s) 105 (hereinafter "user device 105" for ease of reference), a network 110, one or more server(s) 115 (hereinafter "server 115" for ease of reference). While only one of each of user device 105 and server 115 is depicted, the disclosure is not so limited. Rather, two or more of user devices 105 and/or two or more servers 115 may be implemented in accordance with the techniques disclosed herein.

User device 105 may be used to, for example, access a data source (e.g., an application, a website, a server, etc.). User device 105 may exchange data with server 115 over network 110. A user may gain access to user device 105 and/or one or more data sources via user device 105 using an authentication mechanism. The authentication mechanism may include a multi-step authentication, a biometric authentication, or a password strength. A multi-step authentication may be, for example, a two-step authentication that requires a first set of credentials (e.g., a log-in and password) and a secondary verification (e.g., a code sent to an email account). A biometric authentication may be, for example, a facial recognition, a fingerprint recognition, a retina recognition, a fluid test, a breath test, or any other applicable biometric verification.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g., secure machine learning model, risk machine learning model, sanitation model etc.) as well as one or more model states. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

The user device 105 may include a display/UI 105A, a processor 105B, a memory 105C, and/or a network interface 105D. The user device 105 may be a mobile device, such as a cell phone, a tablet, etc. The user device 105 may execute, by the processor 105B, an operating system (OS), a machine learning training component, an or the like. One or more components shown in FIG. 1 may generate or may cause to be generated one or more graphic user interfaces (GUIs) based on instructions/information stored in the memory 105C and/or 115C, instructions/information received from the server 115, and/or the one or more user devices 105. The GUIs may be mobile application interfaces or browser user interfaces, for example.

In various embodiments, the network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the one or more components of exemplary system 100 may one or more of (i) generate, store, train, or use a machine learning model or its applicable components or attributes such as notes, model states, or the like. The exemplary system 100 or one of its components may include a machine learning model and/or instructions associated with the machine learning model, e.g., instructions for generating a machine learning model, training the machine learning model, using the machine learning model, etc. The exemplary system 100 or one of its components may include instructions for retrieving data, adjusting data, e.g., based on the output of the machine learning model, and/or operating a display to output data, e.g., as adjusted based on the machine learning model. The exemplary system 100 or one of its components may include, provide, and/or generate training data.

In some embodiments, a system or device other than the components shown in exemplary system 100 may be used to generate and/or train the machine learning model. For example, such a system may include instructions for generating the machine learning model, the training data and ground truth, and/or instructions for training the machine learning model. A resulting trained machine learning model may then be provided to exemplary system 100 or one of its components. The machine learning model may be stored in any applicable location such as in memory 115C or memory 105C, in a location other than system 100 in operable communication with system 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and or structure. For example, the machine learning model may include one or more convolutional neural networks ("CNN") configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models described herein (e.g., a secure machine learning model, a risk machine learning model, a sanitization machine learning model, etc.) may include a CNN or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of non-optical in vivo images as input, and generate a sequence of locations.

Although depicted as separate components in FIG. 1, it should be understood that a component or portion of a component in the exemplary system 100 may, in some embodiments, be integrated with or incorporated into one or more other components. For example, a portion of the server 115 may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary system 100 may be used.

Further aspects of the machine learning model and/or how it may be utilized as a secure machine learning model, a risk machine learning model, and/or a sanitization machine learning model are described herein. In the following methods, various acts may be performed or executed by a component from FIG. 1, such as the server 115, the user device 105, or components thereof. However, it should be understood that in various embodiments, various other components of the exemplary system 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

As applied herein, one or more machine learning states may correspond to weights, layer configurations, variables, or the like that can be used with a machine learning model. A machine learning state may be a numerical value or may be a relationship that can be used by a machine learning model to generate an output.

Figure 2:
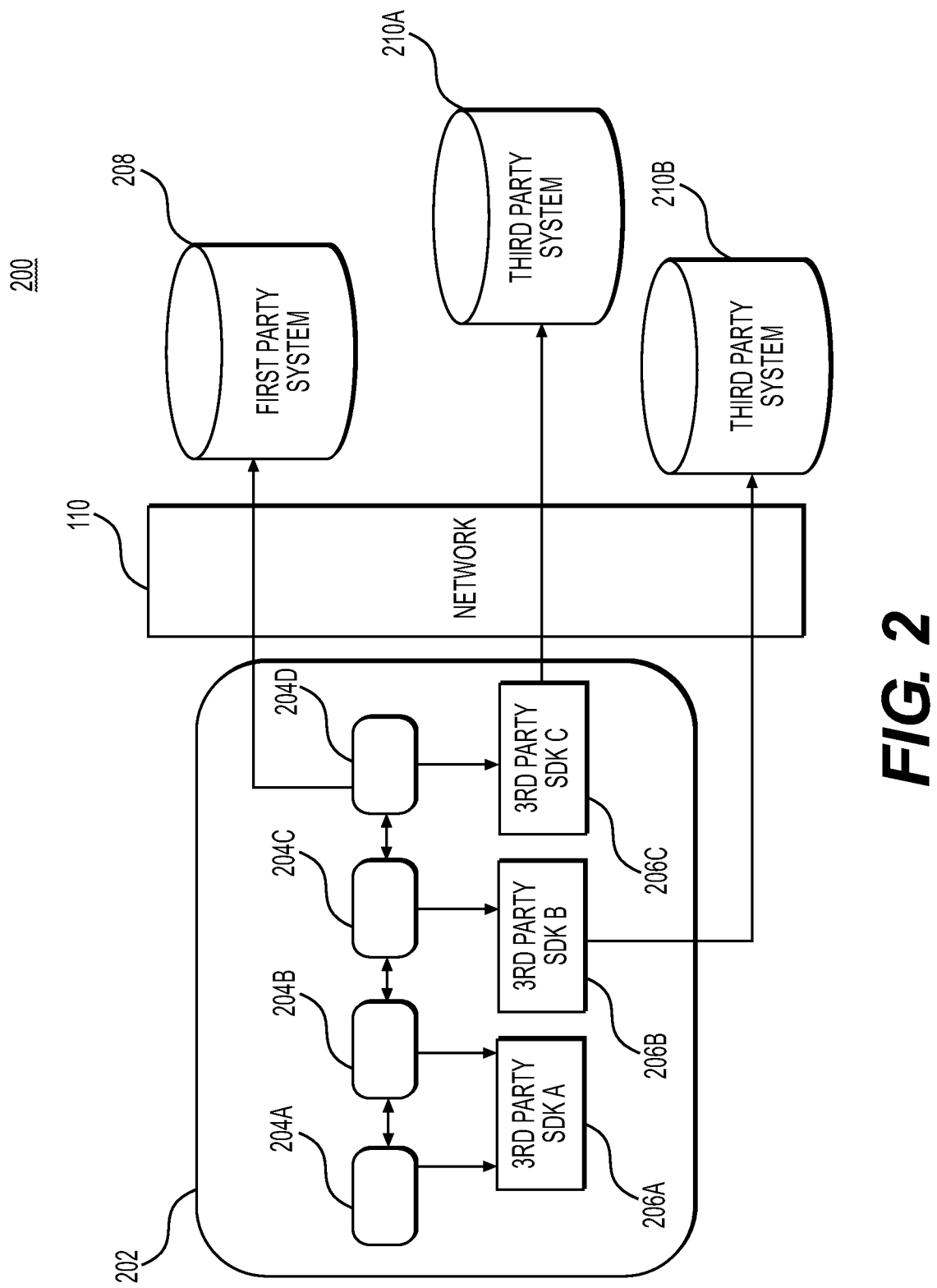
FIG. 2 depicts an exemplary system diagram for securing data for outbound communication, according to one or more embodiments.

FIG. 2 depicts an exemplary system diagram 200 for securing data for outbound communication. As shown in FIG. 2, a data source 202 may include multiple components 204A, 204B, 204C, and 204D. Components 204A, 204B, 204C, and 204D may correspond to different features, data, models, or the like associated with data source 202. For example, component 204A may correspond to user history based functionality whereas component 204B may correspond to real-time user activity information. One or more data source 202 components may be accessed by or otherwise be in communication with a third party SDK (e.g., SDK 206A, SDK 206B, and SDK 206C). As shown components 204A and 204B may be accessed by SDK 206A. Component 204C may be accessed by SDK 206B. Component 204D may be accessed by SDK 206C.

According to implementations of the disclosed subject matter, data source 202 may operate using or may receive information from SDK 206A, SDK 206B, and/or SDK 206C (the "SDKs"). Accordingly, operation of data source 202 may be based on one or more of the SDKs. Additionally, data source 202 and/or one or more of the SDKs may trigger outbound communications. The outbound communications may be, for example, over network 110, over a local network, a wired network, within a user device, or the like. As shown, outbound communications may be received by a first party system 208, a third party system 210A, or a third party system 210B.

First party system 208 may be associated with the same first party as data source 202. Third party systems 210A and/or 2106 may be associated with one or more third parties external to the first party.

FIG. 3 depicts a flowchart 300 of an exemplary method of securing data for outbound communication. At 302 of FIG. 3, a risk profile for an outbound communication may be determined. The outbound communication may be triggered by data source 202, one or more of the SDKs, first party system 208, third party system 210A, and/or third party system 210B. The outbound communication may include data from data source 202 (e.g., from one or more components 204A, 204B, 204C, and/or 204D).

As discussed herein, the risk profile may be based on a user device (e.g., a user device 105 associated with data source 202), on data source 202, on a user profile or the like. The risk profile may be generated by a risk machine learning model. Alternatively or in addition, the risk profile may be determined for each given instance of an outbound communication, based on a user device, data source 202, or user profile. According to an implementation, the risk profile may be generated, at least in part, by a risk engine. For example, a risk engine may be a first party engine, second party engine, or third party engine. The risk engine may have access to user device 105 information, data source 202 information, and/or a user profile. The risk engine may be a standalone or separate risk engine configured to generate risk profiles for multiple data sources (e.g., one or more data sources associated with a first entity).

The risk profile may be or may include a risk threshold. The risk threshold may be static or may be dynamically determined (e.g., by a risk machine model). The risk threshold may be provided to a secure machine learning model (e.g., a federated machine learning model), as further discussed herein. The risk threshold may be used to determine a machine learning model update frequency, as also further discussed herein. The risk threshold may be a value, a score, a scale, a percentage, or the like.

At 304, a scanning policy may be determined based on the risk profile associated with an outbound communication. As discussed herein, a scanning policy may be determined from a plurality of scanning policies. Each of the plurality of scanning policies may include one or more data modules. A data module may be a payload (e.g., one or more of headers, footers, data, metadata, etc.), an origination endpoint (e.g., data source 202, components 204A, 204B, 204C, and/or 204D, etc.), a destination endpoint (e.g., first party system 208, third party system 210A, third party system 210B, etc.), and/or the like. According to an implementation, each of the plurality of scanning policies may include a different combination of data modules. For example, a first scanning policy may include one or both of an origination endpoint and a destination endpoint. A second scanning policy may include the destination endpoint and the payload.

As discussed herein, a scanning policy may be determined based on the risk profile associated with an outbound communication, to balance the risk associated with the communication and the resources allocated to determining an outcome based on the risk. The outcome may be to prevent an outbound communication, allow an outbound communication, or to sanitize an outbound communication. A sanitized outbound communication may be transmitted to a destination endpoint. A destination endpoint may or may not receive an indication that a given outbound communication is an original outbound communication (e.g., not sanitized) or a sanitized outbound communication. For example, an indication that an outbound communication is or is not sanitized may be provided via a header, footer, or the like of a payload. A scanning policy may be selected to match the complexity (e.g., resources) of outbound communication review (e.g., based on modifying the input data modules) with the risk associated with the outbound communication. A higher risk profile may correspond to higher complexity (e.g., more data modules and/or more resource intensive data modules). A lower risk profile may correspond to lower complexity (e.g., less data modules and/or less resource intensive data modules).

At 306, a secure machine learning model may be determined from a plurality of secure machine learning models. The secure machine learning model may be determined based on the risk profile of a given outbound communication. The secure machine learning model may receive one or more inputs, including data modules, based on a determined scanning policy. The secure machine learning model may include weights and/or layers trained to output an outcome for the given outbound communication. The outcome may be to allow the outbound communication, to prevent the outbound communication, or to sanitize the outbound communication before allowing the sanitized outbound communication.

As discussed herein, a secure machine learning model may be determined based on the risk profile associated with an outbound communication, to balance the risk associated with the communication and the resources allocated to determining an outcome based on the risk. The outcome may be to prevent an outbound communication, allow an outbound communication, or to sanitize an outbound communication before allowing the sanitized communication. A secure machine learning model may be selected to match the complexity (e.g., resources) of outbound communication review (e.g., based selecting a more or less complex or computationally extensive secure machine learning model) with the risk associated with the outbound communication. A higher risk profile may correspond to higher complexity (e.g., a model that receives more inputs, that is trained more extensively, and/or is configured to run a more complex set of simulations to generate outputs). A lower risk profile may correspond to lower complexity (e.g., a model that receives less inputs, that is trained less extensively, and/or is configured to run a less complex set of simulations to generate outputs).

According to an implementation, a secure machine learning model may be selected based on a compute expense. A risk profile for a given outbound communication may be determined at 302. Based on the risk profile (e.g., a risk value, a type of risk, etc.), a target compute expense may be determined. The target compute expense may correspond to a number, quantity, time, processing, or the like. The secure machine learning model may be selected from a plurality of secure machine learning models, based on the target compute expense. For example, a secure machine learning model that has an expected compute expense that is closest to, and/or less than, the target compute expense, may be selected for determining an outbound communication outcome.

According to an implementation, the plurality of secure machine learning models may be updated at varying frequencies based on the risk profile levels associated with each respective secure machine learning model. A first secure machine learning model, from the plurality of secure machine learning models, may be highly complex (e.g., above a complexity threshold or computational threshold). Accordingly, the first secure machine learning model may be more likely be applied to high risk profile outbound communications. As the first secure machine learning model may be more likely to be applied to high risk profile outbound communications, the update frequency of the first secure machine learning model may be greater than a second secure machine learning model that is not highly complex (e.g., is below a complexity threshold or computational threshold).

A secure machine learning model update frequency may correspond to the frequency at which a given secure machine learning model is trained/re-trained. A secure machine learning model may be trained/re-trained using updated training data, updated inputs, and/or current event inputs. The training may be conducted using, for example, batch training and/or incremental model updates. Accordingly, a secure machine learning model that is updated more frequently (e.g., a secure machine learning model that is more likely to be applied to higher risk profiles) may be more likely to be trained using more data, more recent data, and/or more applicable data. Accordingly, the more frequently updated secure machine learning model may be more likely to identify security threats and determine outbound communication outcomes based on the same. The model update frequency for a given model may be increased or decreased based on if one or more risk profiles that the model is used for is above or below a risk threshold.

According to an implementation of the disclosed subject matter, a secure machine learning model may be a federated machine learning model. Accordingly a secure machine learning model may be trained via multiple decentralized edge devices (e.g., user devices) or servers holding local data samples, without exchanging the data between user devices. Federated learning may facilitate multiple local components to build a machine learning model without sharing data, while maintaining local data at the local components. Accordingly, a secure machine learning model may include both global parameters and local parameters.

Global parameters may be weights, layers, and/or any other biasing mechanism that is generated, weighted, or otherwise determined by a centralized component. For example, global parameters may be non-data source 202 specific and may include biasing mechanisms that are either selected during initialization of the secure machine learning model and/or trained without local (e.g., user device, data source 202, etc.) data.

Local parameters may be weights, layers, and/or any other biasing mechanism that is generated, weighted, or otherwise determined by a local component. The local component may be a user device, data source 202, a first party local component, a second party component, or the like. The local component may provide data to train a federated secure machine learning model. Local parameters may be generated as a result of the local training. For example, local parameters may be data source 202 specific and may include biasing mechanisms (e.g., weights, layers, etc.) that are either generated and/or updated based on the local data. A local model trained using local data may be provided to a centralized component (e.g., without the local data itself). The centralized component may incorporate the local parameters from a plurality of local components to update a given secure machine learning model.

According to an implementation of the disclosed subject matter, the strength of a secure machine learning model having a local model and/or local parameters and global model and/or global parameters may be adjusted. For example, the strength of a secure machine learning model may be adjusted by placing more weight on the global model prediction/global parameters. The global model may be trained on a larger number of positives across a given population. Accordingly, the global model may be more stringent in determining an outbound communication outcome than a local model.

According to an implementation of the disclosed subject matter, a determination may be made that the risk profile of an outbound communication is above a risk threshold. Based on the determination that the risk profile is above the risk threshold, higher weights may be applied to global parameters of a secure machine learning model, in comparison to weights applied to local parameters of the secure machine learning model. Higher weights applied to global parameters in comparison to weights applied to local parameters may correspond to emphasizing the global parameters more than the local parameters, relative to a baseline. The baseline may be a trained version of a model with applicable weights, layers, and the like, that is then adjusted based on the risk profile and risk threshold. As discussed above, the higher weights applied to the global parameters may result in a stricter outcome determination (e.g., more likely to deny the outbound communication and/or more likely to sanitize the outbound communication). In this implementation, because the outbound communication is determined to have a high risk profile, the stricter weighting may be applicable.

According to an implementation of the disclosed subject matter, a determination may be made that the risk profile of an outbound communication is below a risk threshold. Based on the determination that the risk profile is below the risk threshold, higher weights may be applied to local parameters of a secure machine learning model, in comparison to weights applied to global parameters of the secure machine learning model. Higher weights applied to local parameters in comparison to weights applied to global parameters may correspond to emphasizing the local parameters more than the global parameters, relative to a baseline. The baseline may be a trained version of a model with applicable weights, layers, and the like, that is then adjusted based on the risk profile and risk threshold. Higher weights applied to the local parameters may result in a less strict outcome determination (e.g., less likely to deny the outbound communication and/or less likely to sanitize the outbound communication). In this implementation, because the outbound communication is determined to have a low risk profile, the less stricter weighting may be applicable.

At 308 of FIG. 3, one or more data modules may be provided to a secure machine learning model determined at 306. The secure machine learning model may receive the one or more data modules (e.g., based on a scanning policy determined at 304) and may also receive one or more inputs (e.g., the risk profile) in addition to the one or more data modules. The secure machine learning model may receive, for example, an origination endpoint (e.g., component 204A), a payload or portion of a payload (e.g., a header), a destination endpoint (e.g., third party system 210A, or a destination endpoint classification, as further discussed herein), and/or any other data module to determine an outbound communication outcome.

According to an implementation, a destination endpoint classification may be received and/or maybe accessed by data source 202 and/or a different component. The destination endpoint classification may include information about which subset of a plurality of subsets of a destination endpoint an outbound communication is directed to. For example, first party system 208 may be the destination endpoint for an outbound communication. First party system 208 may have a plurality of classifications (e.g., category A, category B, category C, etc.), each classification corresponding to a subset endpoint of first party system 208.

Accordingly, a data module provided to a secure machine learning model may include a given destination endpoint classification corresponding to an outbound communication. As an example, the destination endpoint may be a Uniform Resource Locator (URL). The URL may point to a destination endpoint and/or to a destination endpoint classification.

A secure machine learning model may be trained to determine an outcome for a given outbound communication, based on received inputs. A secure machine learning model may determine an outcome based on training that balances (e.g., determines a correlation) the transmission of the outbound communication with the risk associated with the transmission. The risk associated with the transmission is filtered by the determination of a scanning policy at 304 and the determination of a secure machine learning model at 306. A determined secure machine learning model applies inputs (e.g., data modules) to output an outcome (e.g., allow communication, prevent communication, sanitize communication, etc.) in view of the inputs.

Accordingly, determining a scanning policy at 304 identifies appropriate inputs for a secure machine learning model, based on a risk profile. Determining a secure machine learning model at 306 identifies an appropriate model with resource appropriate training and consumption, based on the risk profile. The determined secure machine learning model provides an outcome for an outbound communication based on one or more probabilities of data misuse, as determined by inputs such as data modules.

A secure machine learning model may determine that the outcome of an outbound communication is to sanitize the communication. According to an implementation, the secure machine learning model may receive a payload as an input, and may output a sanitized version of the payload at 310, based on the outcome that a given outbound communication is to be sanitized. Alternatively, the payload corresponding to the outbound communication may be provided to a sanitization machine learning model. The sanitization machine learning model may be trained to identify secure information and may redact, remove, modify, and/or otherwise extract the secure information from the payload to generate a sanitized version of the payload at 310. The sanitized version of the payload may be provided for the outbound communication at 312. According to an implementation, a secure machine learning model or sanitization machine learning model may output a sanitized version of the payload that is a null payload. A null payload may correspond to a payload that has no data or that effectively has no data (e.g., if all or most material data from the payload is removed during a sanitization). A null payload may effectively be equivalent to a prevented outbound communication. Alternatively, an outbound communication may be transmitted with the null payload. According to an implementation, if a sanitization results in a null payload, the outbound transmission may be prevented.

Secure information may be any information that is not public information or may not be accessible to the public without substantial effort. Substantial effort may be an amount of effort greater than a public search engine search. For example, secure information may be PII, health records, financial data, activity data, user device data, biometric data, or any other data that an entity, governing body, or user may consider secure.

According to an implementation, a secure machine learning model or sanitization machine learning model may output a degree, extent, or type of sanitization. The degree, extent, or type of sanitization may be used to sanitize an outbound communication to receive a sanitized version of the payload at 310. The degree, extent, or type of sanitization may be based on a risk profile and/or based on data modules input into the secure machine learning model. For example, a secure machine learning model may determine that there is a high probability that a given outbound communication is at a risk of data misuse. Accordingly, the secure machine learning model may determine that a full sanitization of all secure data from a payload should be conducted, for the outbound communication. As another example, a secure machine learning model may determine that there is a high probability that a given destination endpoint is at risk of health data breach. Accordingly, the secure machine learning model may determine that any health data is to be sanitized from an outbound communication.

According to an implementation of the disclosed subject matter, an outcome may be determined by a secure machine learning model without a determined scanning policy or using a static (e.g., single) scanning policy for all or a subset of outbound communications. According to this implementation, a risk profile may be determined at 302. A secure machine learning model may be determined at 306 and a predetermined set of data modules may be provided as inputs to the determined secure machine learning model, at 308.

According to an implementation of the disclosed subject matter, an outcome may be determined based on a scanning policy without the use of a secure machine learning model. According to this implementation, a risk profile may be determined at 302. A scanning policy may be determined based on the risk profile and an outcome (e.g., allow outbound communication, deny outbound communication, and/or sanitize a payload) may be determined based on the security policy. According to this implementation, the security policy may determine the outcome based on the risk profile, data source, user profile, and or user device.

One or more implementations disclosed herein may be applied by using a machine learning model. A machine learning model as disclosed herein may be trained using the system 100 of FIG. 1, system diagram 200 of FIG. 2, and/or flowchart 300 of FIG. 3. As shown in flow diagram 410 of FIG. 4, training data 412 may include one or more of stage inputs 414 and known outcomes 418 related to a machine learning model to be trained. The stage inputs 414 may be from any applicable source including a component or set shown in FIGS. 1-3. The known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a trained machine learning model 450. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RNN), probabilistic models such as Bayesian Networks and Graphical Models, and/or discriminative models such as Decision Forests and maximum margin methods, or the like. The output of the flow diagram 410 may be a trained machine learning model 450.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as the processes illustrated in FIG. 3, may be performed by one or more processors of a computer system, such as any of the systems or devices in the exemplary system 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 4:
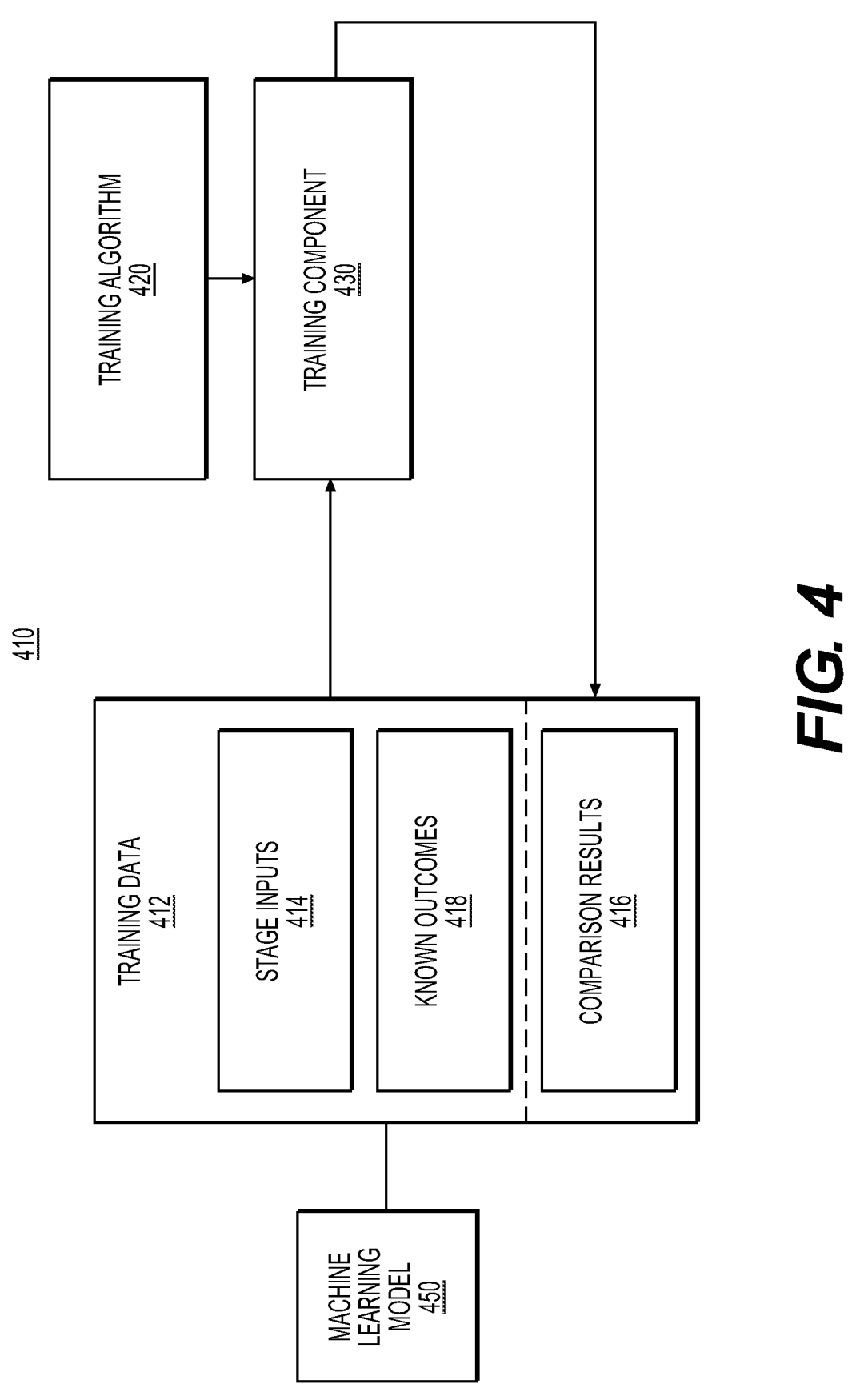
FIG. 4 depicts a flow diagram for training a machine learning model, according to one or more embodiments.
Figure 5:
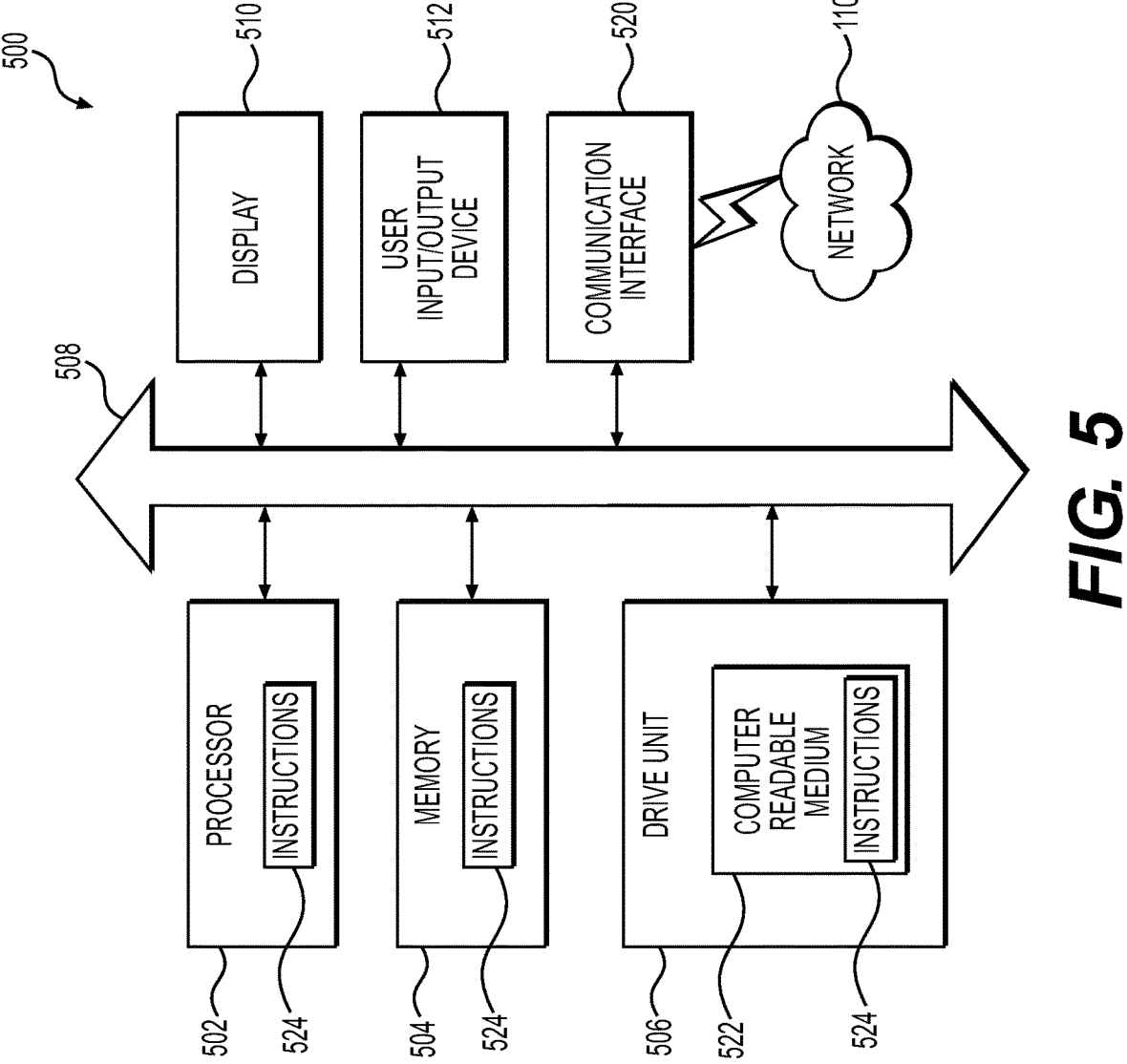
FIG. 5 depicts an example of a computing device, according to one or more embodiments.

FIG. 5 is a simplified functional block diagram of a computer 500 that may be configured as a device for executing the methods of FIGS. 2-4, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit ("CPU") 502, in the form of one or more processors, for executing program instructions. The computer 500 may include an internal communication bus 508, and a drive unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for securing data for outbound communication, the method comprising:
determining a risk profile for the outbound communication based on one or more of a user device, a data source, or a user profile associated with the outbound communication, the outbound communication comprising data modules including at least a payload, an origination endpoint, and a destination endpoint;
determining a scanning policy from a plurality of scanning policies, based on the determined risk profile, each of the plurality of scanning policies indicating different data modules than one or more other scanning policies;
determining, from a plurality of secure machine learning models, a secure machine learning model associated with an expected compute expense, based on the determined risk profile and a target compute expense that is greater than the expected compute expense;
providing one or more data modules to the secure machine learning model, the one or more data modules being indicated in the determined scanning policy;
receiving a sanitized version of the payload based on an output of the secure machine learning model; and
providing the sanitized version of the payload for the outbound communication.

2. The method of claim 1, wherein the risk profile is determined based on a user device authentication mechanism.

3. The method of claim 2, wherein the user device authentication mechanism is one or more of a multi-step authentication, a biometric authentication, or a password strength.

4. The method of claim 1, wherein the risk profile is determined based on a risk engine.

5. The method of claim 1, wherein the secure machine learning model is a federated machine learning model.

6. The method of claim 5, further comprising:
determining that the risk profile is above a risk threshold; and
based on the determining that the risk profile is above the risk threshold, applying higher weights to global parameters of the secure machine learning model in comparison to local parameters of the secure machine learning model.

7. The method of claim 5, further comprising:
determining that the risk profile is below a risk threshold; and
based on the determining that the risk profile is below the risk threshold, applying higher weights to local parameters of the secure machine learning model in comparison to global parameters of the secure machine learning model.

8. The method of claim 5, wherein one or more local parameters for the secure machine learning model are determined based on data at the user device.

9. The method of claim 1, further comprising:
determining that the risk profile is above a risk threshold; and
based on the determining that the risk profile is above the risk threshold, increasing a model update frequency for the secure machine learning model.

10. The method of claim 1, further comprising:
determining that the risk profile is below a risk threshold; and
based on the determining that the risk profile is below the risk threshold, decreasing a model update frequency for the secure machine learning model.

11. The method of claim 1, wherein the sanitized version of the payload is a null payload, and wherein the method further comprises:
preventing the outbound communication based on the null payload.

12. The method of claim 1, wherein the risk profile is output by a risk machine learning model based on one or more of the data modules.

13. The method of claim 1, wherein the risk profile is further determined based on a destination endpoint classification.

14. A method, comprising:
determining a risk profile for an outbound communication based on one or more of a user device, a data source, or a user profile associated with the outbound communication, the outbound communication comprising data modules including at least a payload, an origination endpoint, and a destination endpoint;
determining a scanning policy from a plurality of scanning policies, based on the determined risk profile, each of the plurality of scanning policies indicating different data modules than one or more other scanning policies;
determining, from a plurality of secure machine learning models, a secure machine learning model associated with an expected compute expense, based on (i) the determined risk profile, (ii) an authentication level corresponding to the determined risk profile, and (iii) a target compute expense that is greater than the expected compute expense;
providing one or more data modules to the secure machine learning model to generate an output, the one or more data modules being indicated in the determined scanning policy;
identifying a data risk value based on the output of the secure machine learning model; and based on the data risk value, determining one of allowing the outbound communication, preventing the outbound communication, or sanitizing the payload.

15. The method of claim 14, wherein the risk profile is determined based on a user device authentication mechanism.

16. The method of claim 15, wherein the user device authentication mechanism is one or more of a multi-step authentication, a biometric authentication, or a password strength.

17. The method of claim 14, wherein the risk profile is determined based on a risk engine.

18. The method of claim 14, wherein the secure machine learning model is a federated machine learning model.

19. The method of claim 14, wherein the risk profile is further determined based on a destination endpoint classification.

20. A system comprising:

a data storage device storing processor-readable instructions; and a processor operatively connected to the data storage device and configured to execute the instructions to perform operations that include:

determining a risk profile for an outbound communication based on one or more of a user device, a data source, or a user profile associated with the outbound communication, the outbound communication comprising data modules including at least a payload, an origination endpoint, and a destination endpoint;

determining a scanning policy from a plurality of scanning policies, based on the determined risk profile, each of the plurality of scanning policies indicating different data modules than one or more other scanning policies;

determining, from a plurality of secure machine learning models, a secure machine learning model associated with an expected compute expense, based on (i) the determined risk profile, (ii) an authentication level corresponding to the determined risk profile, and (iii) a target compute expense that is greater than the expected compute expense;

providing one or more data modules to the secure machine learning model, the one or more data modules being indicated in the determined scanning policy;

receiving a sanitized version of the payload based on an output of the secure machine learning model; and providing the sanitized version of the payload for the outbound communication.

* * * * *